(12) United States Patent
Dupays et al.

(10) Patent No.: US 11,339,683 B2
(45) Date of Patent: May 24, 2022

(54) METHOD FOR STARTING A TURBINE ENGINE IN COLD WEATHER AND SYSTEM FOR STARTING A TURBINE ENGINE

(71) Applicant: SAFRAN AIRCRAFT ENGINES, Paris (FR)

(72) Inventors: Clement Dupays, Moissy-Cramayel (FR); Gwenole Yann Le Pache, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 98 days.

(21) Appl. No.: 16/958,012

(22) PCT Filed: Dec. 19, 2018

(86) PCT No.: PCT/FR2018/053394
§ 371 (c)(1),
(2) Date: Jun. 25, 2020

(87) PCT Pub. No.: WO2019/129952
PCT Pub. Date: Jul. 4, 2019

(65) Prior Publication Data
US 2021/0062721 A1    Mar. 4, 2021

(30) Foreign Application Priority Data
Dec. 29, 2017 (FR) ...................................... 1763361

(51) Int. Cl.
*F01D 25/10* (2006.01)
*F02C 7/275* (2006.01)
(Continued)

(52) U.S. Cl.
CPC ............. *F01D 25/10* (2013.01); *F01D 19/02* (2013.01); *F01D 25/36* (2013.01); *F02C 7/26* (2013.01);
(Continued)

(58) Field of Classification Search
CPC .......... F01D 25/10; F01D 19/02; F01D 25/36; F01D 19/00; F02C 7/26; F02C 7/275;
(Continued)

(56) References Cited

U.S. PATENT DOCUMENTS 5,051,670 A    9/1991  De Piola
5,741,965 A    4/1998  Hernandez et al.
(Continued)

FOREIGN PATENT DOCUMENTS

| FR | 2981986 A1 | 5/2013 |
|---|---|---|
| FR | 3025252 A1 | 3/2016 |
| WO | 2007/102738 A1 | 9/2007 |

OTHER PUBLICATIONS

International Search Report received for PCT Patent Application No. PCT/FR2018/053394, dated Apr. 17, 2019, 5 pages (2 pages of English Translation and 3 pages of Original Document).

*Primary Examiner* — Gerald L Sung
*Assistant Examiner* — Rene D Ford
(74) *Attorney, Agent, or Firm* — Womble Bond Dickinson (US) LLP

(57) ABSTRACT

The invention relates to a method for starting a turbine engine in cold weather, including a starting system intended for rotating a drive shaft of the turbine engine, the method comprising the following steps: —a pre-starting step in which a first starting signal is generated to control the drive shaft in a first direction of rotation about a longitudinal axis (X) and in a second opposite direction of rotation in an alternating manner; and —a starting step in which a second starting signal is transmitted to the starting system in order for the latter to drive the drive shaft of the turbine engine in a normal direction of rotation and in which the drive shaft is rotated until a rotation speed that causes the turbine engine to start.

16 Claims, 2 Drawing Sheets

(51) Int. Cl.
*F02C 7/26* (2006.01)
*F01D 25/36* (2006.01)
*F01D 19/02* (2006.01)
*F01D 19/00* (2006.01)

(52) U.S. Cl.
CPC .............. *F02C 7/275* (2013.01); *F01D 19/00* (2013.01); *F05D 2210/44* (2013.01); *F05D 2220/323* (2013.01); *F05D 2220/76* (2013.01); *F05D 2260/85* (2013.01); *F05D 2270/303* (2013.01); *F05D 2270/304* (2013.01)

(58) Field of Classification Search
CPC ........... F05D 2210/44; F05D 2220/323; F05D 2220/76; F05D 2260/85; F05D 2270/303; F05D 2270/304; F05D 2270/313; Y02T 50/60
See application file for complete search history.

(56) References Cited

U.S. PATENT DOCUMENTS

| | | | |
|---|---|---|---|
| 9,745,897 B2 * | 8/2017 | Francisco | F02C 7/277 |
| 2010/0107648 A1 * | 5/2010 | Bulin | F01D 25/10 |
| | | | 60/778 |
| 2016/0061061 A1 | 3/2016 | Ekanayake et al. | |
| 2018/0187601 A1 * | 7/2018 | Segura | F28D 7/0008 |
| 2020/0165976 A1 * | 5/2020 | Brown | F01D 25/10 |

* cited by examiner

METHOD FOR STARTING A TURBINE ENGINE IN COLD WEATHER AND SYSTEM FOR STARTING A TURBINE ENGINE

1. FIELD OF THE INVENTION

The present invention relates to the field of turbine engines, in particular for aircraft. More specifically, the invention relates to a method for starting a turbine engine in cold weather and a system for starting a turbine engine.

2. PRIOR ART

The prior art comprises document US-A1-2016-0061061.

A turbine engine generally comprises, from upstream to downstream, according to the circulation of the gases in the turbine engine, a compressor assembly, a combustion chamber and a turbine assembly. The compressor and turbine assembly respectively comprise at least one compressor and at least one turbine. The compressor and the turbine of a body of the compressor and turbine assembly each comprise one or more stages. A drive shaft, typically the shaft of a high pressure body of a two spool and double flow turbine engine, connects a compressor to a turbine to drive the compressor. This drive shaft transmits the power thereof via an accessory gearbox to various accessories mounted on a box, for the operation thereof. These accessories can be fuel and lubrication pumps, electric generators, starters, etc. Starters and electric generators are usually separate accessories that have as the function thereof, the starting of the turbine engine and the production of electrical energy for the various accessories and equipment respectively. The starter which uses external energy, electrical or pneumatic for example, supplies a starting torque intended to rotate the drive shaft so as to make it possible for it to reach a rotation speed that is sufficient to ignite the combustion chamber via the air compressed by the compressor.

During starting in outside temperatures considered to be "normal", for example typically temperatures greater than 10° C., the absolute value of the starting torque Cd generally follows a curve L1 that has a first phase in the form of a stage and a second descent phase as shown in FIG. 1. The first phase corresponds to the fact that the starter is controlled such that it supplies a substantially constant starting torque Cdm for which it was specified until the rotation speed N of the drive shaft substantially reaches a value N1 that makes it possible to launch the ignition phase where the combustion chamber of the turbine engine is ignited. The second phase corresponds to the fact that starting from the value N1, the rotation speed of the drive shaft continue to increase until the turbine engine reaches a stable operating regime. The curve L1 of the variation of the starting torque Cd decreases, for example according to a linear function according to the rotation speed of the drive shaft which is adapted to accompany the rise in power of the turbine engine until it supplies an engine torque.

At these "normal" outside temperatures, the turbine engine exerts on the drive shaft, before ignition, a resistive torque Cr that follows the curve L2 and which increases with the rotation speed N of the drive shaft until a maximum resistive torque Cr1 when the rotation speed reaches the value N1 to ignite the turbine engine. The resistive torque Cr decreases regularly until it is cancelled when the rotation speed of the drive shaft reaches a value N3, then becoming an engine torque.

However, in cold weather, i.e. when the outside temperature is typically less than −10° C., and in particular in very cold weather when the outside temperature is typically between −30° C. and −50° C., the turbine engine encounters difficulties at starting, in particular when it has been immobilised for a significant period (more than twenty-four hours, for example). Indeed, the turbine engines generally very strongly resist the force developed by the starter at the beginning of the starting phase. For example, as shown in FIG. 1 for an outside temperature of −40° C., in response force from the starter of which the starting torque Cd follows the curve L1, the resistive torque Cr then follows the curve L3, which has a peak value Cr2. This peak value Cr2 appears when the rotation speed of the drive shaft reaches a value N2 (low speed) which is less than the rotation speed N1 corresponding to ignition. When the rotation speed reaches the value N1, the resistive torque reaches a second maximum value Cr'1, before the resistive torque Cr decreases after ignition. In other words, a resistive peak occurs at the beginning of the starting sequence. Generally, the maximum values Cr2 and Cr'1 of the resistive torque are greater than the maximum value Cr1 reached at "normal" temperatures.

This peak resistive torque is due in particular to the increase in the viscosity of the lubricants retained in the bearings of the accessory gearbox and in the bearings of the turbine engine according to the prolonged stoppage of the turbine engine and/or by cold outside temperatures, typically less than −10° C., even very cold, typically less than −30° C. In very cold temperature conditions, viscosity is very high which induces strong viscous friction phenomena. The lubricant has difficulty in circulating within the turbine engine. As the viscosity of lubricants is low at normal temperatures, the resistive peak is therefore not present.

To overcome this resistive torque, the starter is specified such that the starting torque Cdm supplied during the first phase of the curve L1 is greater than the maximum value Cr2 reached by the resistive torque Cr at very cold temperatures, with the maximum value being increased by a value ΔC to drive the drive shaft. However, this involves an increase in the size of the starting chain (which comprises in particular, the starter but also gears and the drive shaft). Such a size is penalising in terms of mass and volume for the elements of the starting chain.

A method is known from document FR-A1-3025252 that makes it possible to control the torque exerted by the starter according to the rotation speed of a turbine of the turbine engine such that the starting of the turbine engine is more robust regardless of the environment wherein the latter is present, in particular the environment of the aircraft. However, this method does not make it possible to prevent resistive torques, in particular the resistive torque Cr2 at low speed.

In document U.S. Pat. No. 5,051,670, a method is described that makes it possible to adjust the torque exerted by the starter according to an increasing and decreasing curve so as to reduce the electrical consumption of the starter. However, this method also does not make it possible to prevent resistive torques, in particular the resistive torque Cr2 at low speed.

In all of the cases mentioned above, the rotation of the drive shaft in the same direction leads to having to greatly increase the torque applied to carry out both the removal and the heating of the lubricant. This also results in an increase in fatigue stresses over the entire transmission chain.

Also known is the implementation of a heat exchanger that makes it possible to heat the lubricants and to reduce the viscosity. However, this entails one or more additional members that influence the dimensions and the mass of the turbine engine.

3. AIM OF THE INVENTION

The present applicant has therefore set in particular as an aim to provide a solution that makes it possible to facilitate the starting of the turbine engine in particular at very cold outside temperatures whilst avoiding an increase in the mass of the turbine engine.

4. DISCLOSURE OF THE INVENTION

This aim is achieved according to the invention by a method for starting in cold weather of a turbine engine comprising a starting system intended for rotating a drive shaft of the turbine engine, the method comprising the following steps:

a pre-starting step wherein a first starting signal is generated to control the drive shaft in a first direction of rotation about a longitudinal axis and in a second opposite direction of rotation in an alternating manner so as to generate oscillations, and a starting step wherein a second starting signal is transmitted to the starting system such that the latter drives the drive shaft of the turbine engine in a normal direction of rotation and wherein the drive shaft is rotated until a rotation speed that causes the turbine engine to start.

Thus, this solution makes it possible to achieve the aim mentioned above. In particular, the rotation of the drive shaft in one direction then in another, alternately, generates oscillations, even micro-oscillations that make it possible to sufficiently heat the lubricant contained in the rolling elements, the gearwheels and/or bearings of the turbine engine. The heating of the lubricant therefore results in a reduction of the viscosity of the lubricant which can then be removed from rolling elements. As the viscosity of the lubricant is reduced, the resistive torque which generally appears in very cold weather is decreased and even suppressed. Such an operating mode makes it possible to prevent the oversizing of the starting system, in particular of the starter, and/or of the turbine engine which influences the mass and drag thereof.

According to an embodiment of the invention, the drive shaft is the shaft of a high pressure body of the turbine engine which is a two spool and double flow turbine engine.

According to another embodiment of the invention, the drive shaft is coupled to an accessory gearbox comprising a lubricant of which the viscosity increases at low temperature, in particular at a temperature less than −10° C. and more specifically less than −30° C. The accessories of the gearbox can be rotated along the first and second directions of rotation alternately. If an accessory supports only one direction of rotation, it can be coupled to the accessory gearbox by a clutch or freewheel system. The alternating direction of rotation makes it possible to facilitate the starting of the turbine engine, since the oscillations of the drive shaft in the two directions allow the heating and the removal of the viscous lubricant contained in the bearings of the drive shaft, and the oscillations of the elements of the accessory gearbox will make it possible for the heating and the removal of the viscous lubricant contained in the rolling elements and gearwheels of the latter.

According to a feature of the invention, the pre-starting step is carried out for a determined total duration.

According to another feature, the pre-starting step is carried out at a predetermined pre-starting rotation speed of the drive shaft.

According to another embodiment of the invention, the determined total duration and/or the pre-starting rotation speed of the pre-starting step is/are determined according to the temperature of the lubricant in the vicinity of the accessory gearbox, according to a resistive torque exerted by the turbine engine or according to the temperature outside the turbine engine.

According to an embodiment of the invention, the method comprises a step of determining a lubricant temperature wherein a signal that indicates the temperature in response to a lubricant temperature measured in the vicinity of the accessory gearbox or in the latter is compared to a lubricant temperature threshold value, such that when the temperature measured is greater than the threshold temperature value, the second starting signal is generated to control the drive shaft of the turbine engine in a normal direction of rotation. This step makes it possible to verify that the lubricant has reached a sufficient temperature by heating and that a real starting sequence can be controlled. This also makes it possible to determine at least the duration of the pre-starting step.

According to another embodiment of the invention, the method comprises a step of determining a resistive torque exerted by the turbine engine wherein a signal that indicates the torque in response to the resistive torque measured is compared to a threshold torque value for a given rotation speed of the turbine engine such that when the resistive torque measured becomes less than or equal to the threshold torque value, the second starting signal is generated to control the drive shaft of the turbine engine in a normal direction of rotation. Likewise, this step makes it possible to verify the condition of the lubricant in the rolling elements and/or gearwheels according to the torque exerted by the turbine engine and to determine at least the duration of the pre-starting step.

According to the resistive torque measured, it is therefore possible to know if the lubricant in the accessory gearbox has become less viscous, and in this case to deduce therefrom that this resistive torque exerted by the turbine engine in the starting phase at very cold temperatures will remain less than a threshold that can prevent the starting of the turbine engine. The starting phase of the turbine engine can therefore be launched, or otherwise the pre-starting phase will be maintained to continue the heating of the lubricant within the accessory gearbox.

According to a feature of the invention, the second starting signal is generated after a predetermined waiting duration that follows the completion of the pre-starting step, the speed of the drive shaft being zero when the starting step is triggered.

According to yet another feature of the invention, the maximum pre-starting rotation speed of the drive shaft reached during the pre-starting is less than the rotation speed that causes the turbine engine to start.

Advantageously, but without limitation, the maximum pre-starting rotation speed during the pre-starting is between 100 rpm and 1000 rpm. Such a speed does not make it possible for the starting of the turbine engine and prevents oversizing the starting system.

According to yet another feature of the invention, the duration of the pre-starting step is predetermined and between 10 s and 300 s.

According to another feature of the invention, the step of determining a lubricant temperature is carried out before or after the step of emitting the first starting signal.

According to an embodiment, the method comprises a step of determining an outside temperature wherein a signal indicating the outside temperature in response to a measured temperature is compared with a threshold temperature value such that, when the outside temperature measured is less than or equal to the threshold temperature value, the first starting signal is generated.

Advantageously, but without limitation, the first signal and the second starting signal are applied to a starter coupled to the drive shaft of the turbine engine.

The invention also relates to a starting system for a turbine engine, the system comprising an electronic control module, a starter intended to be controlled by the electronic control module and a drive shaft of the turbine engine coupled to the starter, the electronic control module being arranged to generate a first signal intended to control the rotation of the drive shaft in a first direction of rotation according to a longitudinal axis and in a second opposite direction of rotation, alternately so as to generate oscillations, and to generate a second signal intended to control the rotation of the drive shaft in a normal direction of rotation wherein the drive shaft is rotated until a rotation speed that causes the turbine engine to start. Thus, such a system makes it possible to oscillate, via the drive shaft, the accessory gearbox so as to heat the lubricant contained in the rolling elements of the accessory gearbox and to reduce the viscosity thereof. As the viscosity is reduced, the resistive peak provided at the starting of the turbine engine will be reduced and even suppressed.

According to a feature of the system, the drive shaft is coupled to an accessory gearbox to which the starter is mounted, the latter being capable of actuating the drive shaft in the first and second opposite directions of rotation alternately.

According to a feature of the invention, the starting system comprises a temperature detecting means for detecting temperature which is connected to the electronic control module and is configured so as to supply a signal that indicates the temperature of the lubricant in the vicinity of an accessory gearbox of the turbine engine.

According to a feature of the invention, the starting system comprises determining means for determining the torque connected to the electronic control module and configured to supply a signal that indicates the torque exerted by the turbine engine.

Advantageously, but without limitation, the starting system comprises a determining means for determining the angular displacement so as to determine the direction of rotation and the rotation speed of the drive shaft of the turbine engine, the determining means being connected to the electronic control module.

According to an embodiment of the invention, the starter comprises an electric starter, for example a starter-generator.

5. BRIEF DESCRIPTION OF THE FIGURES

The invention will be better understood, and other aims, details, embodiments and advantages of the latter will appear more clearly upon reading the following detailed explanatory description, of an embodiment of the invention provided purely for the purposes of information and in no way limiting, with reference to the appended schematic drawings, wherein.

6. DESCRIPTION OF EMBODIMENTS OF THE INVENTION

Figure 2:
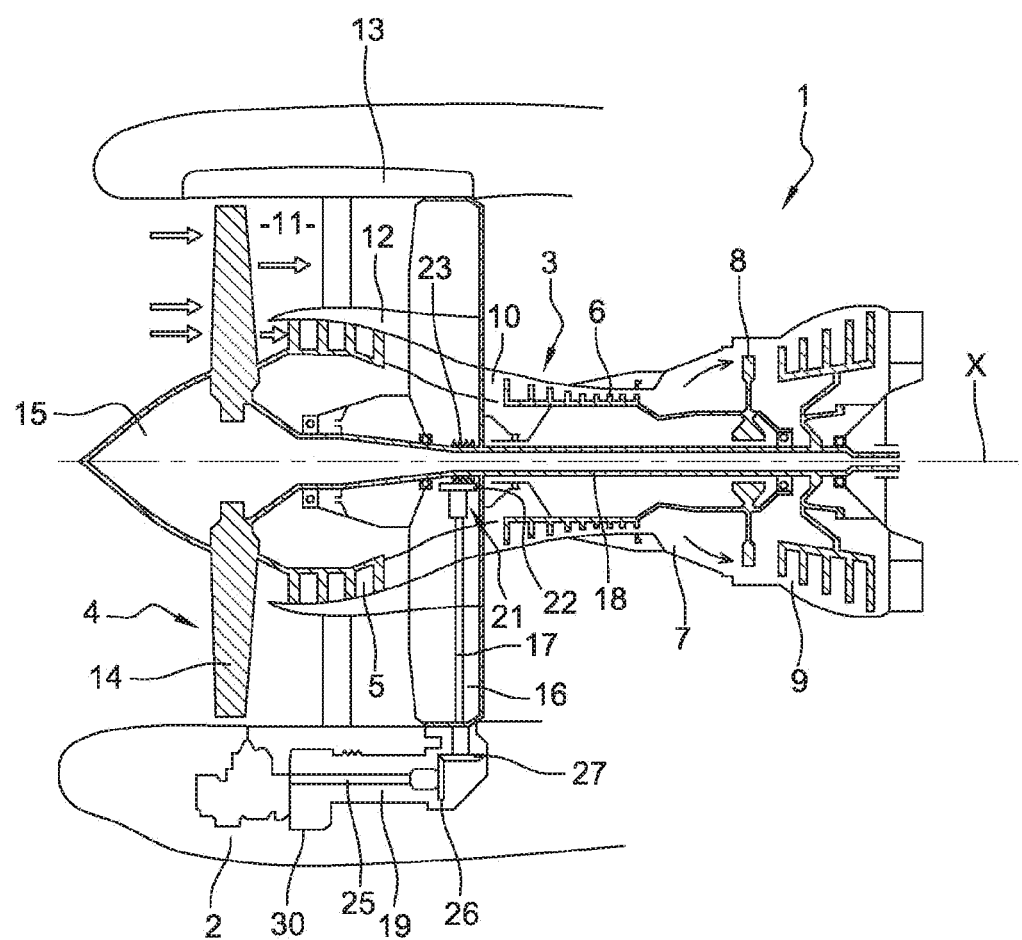
FIG. 2 is an axial, cross-sectional view of an example of a turbine engine to which the invention applies; and, FIG. 3 schematically shows certain members of the starting system of the turbine engine and of the turbine engine according to the invention.

FIG. 2 shows an axial, cross-sectional view of a turbine engine of longitudinal axis X, and in particular, a double flow turbine engine according to the invention. Of course, the invention is not limited to this type of turbine engine. This turbine engine 1 generally comprises a nacelle 2 that surrounds a gas generator 3 of longitudinal axis X upstream from which is mounted a fan 3. In the present invention, and in general, the terms "upstream" and "downstream" are defined with respect to the circulation of the gases in the turbine engine 1, and substantially along the longitudinal axis X. The gas generator 3 comprises from upstream to downstream, a low pressure compressor 5, a high pressure compressor 6, a combustion chamber 7, a high pressure turbine 8 and a low pressure turbine 9. The turbine engine 1 comprises a primary duct 10 wherein a primary flow circulates that passes through the gas generator 3. The latter also comprises a secondary duct 11 wherein circulates a secondary flow between the nacelle 2 and a housing, here an intermediate casing 12 surrounding the gas generator 3. A fan casing 13 which is integral with the nacelle 2, delimits fan blades 14 that extend radially from a hub 15. The term "radial" is defined with respect to a radial axis perpendicular to the longitudinal axis X of the turbine engine.

A casing arm 16 extends radially between the intermediate casing 12 and the nacelle 2 and is substantially tubular. The casing arm 16 is passed through radially by a radial input shaft 17. The latter is connected to a drive shaft 18 of the turbine engine coaxial to the longitudinal axis X. In particular, the radial input shaft 17 provides a power transmission between the drive shaft 18 and an accessory gearbox 19 or accessory relay known as an "Accessory Gearbox" (AGB). In other words, the drive shaft 18 rotates the members of the accessory gearbox 19 when the latter is in rotation. To this effect, a first power transmission mechanism 21 is arranged between the radial input shaft 17 and the drive shaft 18. The first power transmission mechanism 21 comprises a first pinion 22 integral with the radial input shaft 17. The first mechanism 21 also comprises a second pinion 23 integral with the drive shaft 18. The first pinion 22 meshes with the second pinion 23. According to an embodiment, the first and second pinions 22, 23 are tapered so as to form an angle gear between the radial input shaft 17 and the drive shaft 18. A second power transmission mechanism 24 is arranged between the radial input shaft 17 and the drive shaft 18. The second power transmission mechanism 24 comprises a third pinion 26 and a fourth pinion 27. The third pinion 26 is integral here with a main shaft 25 connected to the accessory gearbox 19. The main shaft 25 is substantially parallel to the longitudinal axis X. Regarding the fourth pinion 27, the latter is integral with the radial input shaft 17. The fourth pinion 27 is opposite along the radial axis to the first pinion 22. Advantageously, the third and fourth pinions 26, 27 are tapered so as to form an angle gear between the main shaft 25 and the radial input shaft 17. Here, the drive shaft 18 is the high pressure shaft that connects the high pressure compressor 6 and the high pressure turbine 8 so as to form a high pressure body.

The accessory gearbox 19 comprises several gearwheels mounted in series. In particular, first toothed wheels are integral with the main shaft 25 of the accessory gearbox 19.

Each first toothed wheel meshes with a second toothed wheel connected to an accessory or equipment of the turbine engine via a secondary shaft. The main shaft 25, the first and second toothed wheels and the secondary shafts are housed in a housing 30 of the accessory gearbox. These accessories coupled to the gearbox 19 comprise for example, as was seen in the preamble, a starter 20, fuel pumps 29, lubrication, hydraulics, a de-oiler (not shown), an electric generator (not shown), etc. The starter 20 makes it possible to start the turbine engine 1 and to generate an electrical energy after the starting via the first and second mechanisms 21, 24. In particular, the starter 20 rotates the high pressure shaft 18.

The accessory gearbox 19 is installed in the nacelle 2 as shown in FIG. 2. In this way, the accessory gearbox 19 is mounted outside the secondary duct 11. The starter 20 is mounted on the accessory gearbox 19, it is therefore capable of driving the high pressure shaft 18 through the accessory gearbox 19 and the radial input shaft 17.

Alternatively, in a manner known per se, it is possible to couple the starter 20 to the high pressure shaft 18 without passing through the accessory gearbox 19. In this alternative, the starter 20 drives the high pressure shaft 18 without the accessory gearbox 19 participating in the transmission. In this same alternative, the accessory gearbox 19 is then driven by the starter 20 through the high pressure shaft.

The turbine engine also comprises an oil circuit for lubricating rolling elements such as bearings 31 mounted on the high pressure shaft 18, pinions and toothed wheels and/or bearings of secondary shafts in the accessory gearbox 19.

Figure 1:
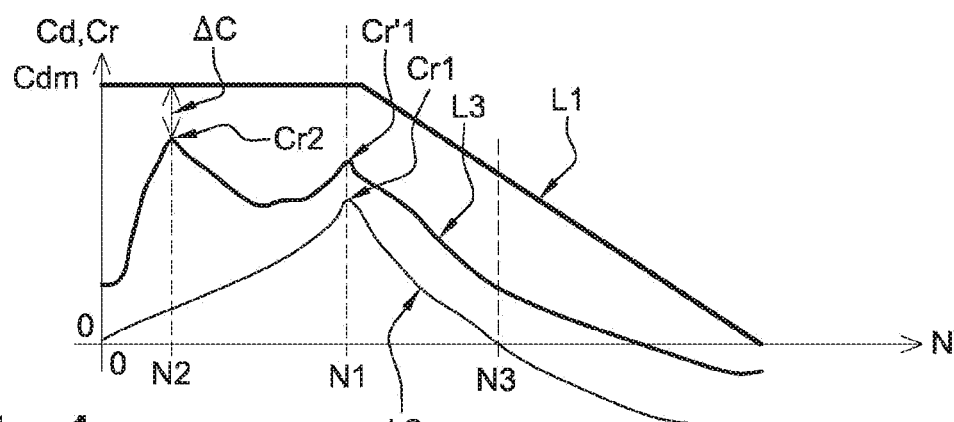
FIG. 1 shows the changes in torque exerted by the starting system and the turbine engine on a drive shaft during a starting phase carried out according to the prior art.
Figure 3:
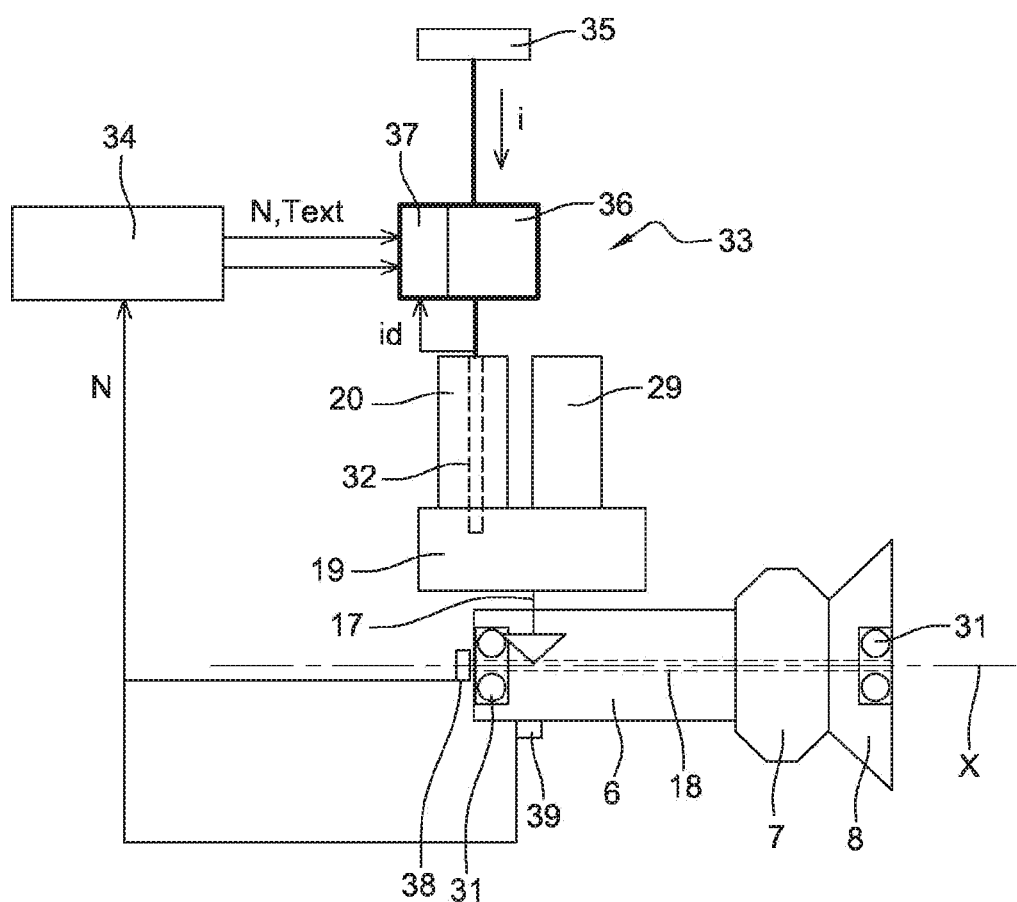

With reference to FIG. 3, the starter 20 is part of a starting system of the turbine engine for driving the high pressure shaft 18 to a rotation speed that causes the turbine engine to start. In the scope of this example, the high pressure shaft 18 is rotated from a first speed V0 which can be zero, corresponding to the stoppage of the turbine engine, or which can be relatively low in the normal direction of rotation, to a second rotation speed V2 that allows the turbine engine to operate autonomously. The expression "normal direction of rotation" means in the present invention, the direction that makes it possible for the operation of the turbine engine to generate a thrust. The second rotation speed V2 corresponds to the rotation regime N1 mentioned above with reference to FIG. 1, which allows the starting of the turbine engine and in particular ignition of the combustion chamber 7.

For this, the starter 20 comprises an output shaft 32 that is coupled to the accessory gearbox 19 to deliver a starting torque to the high pressure shaft 18. The starting system comprises an electronic control module 33 (termed SCU) that is intended to control the starter 20. This electronic control module 33 communicates with an electronic unit 34 of the turbine engine. The electronic unit 34 can be a processor (termed ECU for "Electronic Control Unit"). The control module 33 receives from the electronic unit indications of the rotation speed of the high pressure shaft 18, temperature measurements, and starting signals as described hereinafter. The control module 33 directly receives, furthermore, a current intensity Id measured in the starter 20. In the present example, the starter 20 is an electric starter and is powered by an electrical power source. The latter can be a battery, an external power supply of the mains power socket type, or the network on board the aircraft. The electric starter is a three-stage synchronous machine. Other technologies are possible, such as an asynchronous machine, a synchronous machine with a permanent magnet, with direct current. The operating principle is similar for the control in torque.

Alternatively, the starter is a starter-generator connected to the high pressure shaft and capable of functioning in generator mode at the end of the starting phase. Advantageously, but without limitation, the starter-generator has a variable frequency known as "Variable Frequency Starter Generator" (VFSG).

In the remainder of the present invention, the starter is considered to be an electric starter, for example a starter-generator.

The control module 33 is also connected to an electric circuit 35 of the aircraft to which the turbine engine is fitted and which is coupled to the source of electrical power. The electric circuit 35 transfers an electric power i which is delivered to the starter 20 via a power transfer device 36 that comprises the control module 33. The control module 33 further comprises a control device 37 that controls the power transfer device 36 according to the starting torque to be exerted. It can be considered to include this control device 37 in the electronic unit 34. The control module 33 then controls the torque developed by the starter 20 by adjusting the electric power i which is transmitted to the starter 20. The accessory gearbox 19 therefore participates in the starting of the turbine engine by transforming the torque exerted on the output shaft 32 of the starter into a starting torque exerted on the high pressure shaft 18. Once the high pressure shaft 18 reaches the second speed V2 corresponding to the fact that the turbine engine has started, the rotation energy of the high pressure shaft 18 is distributed to the other essential accessories for the operation of the turbine engine and of the aircraft via the radial input shaft 17 and the first and second mechanisms 21, 24.

The method of starting the turbine engine by means of the starting system will now be described. The method for starting comprises a pre-starting step prior to a conventional starting step of the turbine engine where the drive shaft, here the high pressure shaft 18, is rotated from the first zero rotation speed to the second rotation speed that causes the turbine engine to start.

In particular, in the pre-starting step, a first starting signal is generated to control the driving of the high pressure shaft 18 in a first direction of rotation, then in a second opposite direction of rotation about the longitudinal axis X, and this operation is repeated alternately. In a second starting step, a second starting signal is then generated to control the high pressure shaft of the turbine engine in a normal direction of rotation until the second rotation speed V2 that causes the turbine engine to start as will be seen below in the description.

The first starting signal is generated by the control module 33 and is transmitted to the starter 20 driving the high pressure shaft 18 in the first and second directions of rotation alternately. In other words, the high pressure shaft 18 is controlled so as to cause angular "back-and-forth" movements about the longitudinal axis of the turbine engine to produce several oscillations. In the present invention, the term "oscillation" means movements of rotation in the clockwise and anti-clockwise directions about the longitudinal axis of the turbine engine.

The rotation of the high pressure shaft 18 generates the rotation of the accessories coupled to the accessory gearbox 19 connected to the latter, via the radial input shaft 17, in the first and second directions of rotation alternately.

This sequence of alternating rotations makes it possible to sufficiently heat the lubricant contains and retained in the bearings of the accessory gearbox, via viscous friction, so as to reduce the viscosity thereof. Indeed, through the torque oscillations applied by the starter 20 at the launching of the pre-starting sequence, which causes small alternating amplitudes of rotations of the high pressure shaft 18, it is possible to locally carry out heating of the lubricant without forcing on the torque. The torque oscillations successively compress and decompress the fixed lubricant, by progressively increasing the oscillation amplitude, which heats the lubricant without circulating it significantly and without forcing it in the same direction.

Therefore, there is no risk of an accumulation of viscous lubricant in the same zone of the accessory gearbox contrary to a known method wherein by applying a particularly high torque in only one direction, the bearings of the accessory gearbox are forced to always rotate in the same direction. With such a known method, the applicant was able to study that the rotation torque applied in a single direction forces the still viscous lubricant to be removed from the bearings to a same zone of the accessory gearbox which can be in interaction with the rotating elements (bearings, pinions, shafts, etc.), thus causing the risk of substantially increasing the cold resistive torque of these rotating elements. On the other hand, particularly forcing on the torque to remove the still viscous lubricant has the risk of damaging internal components of the accessory gearbox, including the bearings thereof.

With the method for starting according to the invention, the lubricant can be heated sufficiently by viscous friction, such that the viscosity thereof is significantly reduced when it is removed from the bearings. In addition, the torque oscillations applied by the starter 20, during the pre-starting sequence, are carried out without forcing on the torque applied to the accessory gearbox of which the internal components thus avoid being damaged. Moreover, the oscillations of the high pressure shaft 18 will also make it possible to heat and to remove the lubricant present in the bearings 30 of the shaft 18, and thus to facilitate the starting of the turbine engine.

The starting system 20 also comprises a determining means 38 for determining the angular displacement intended to identify the direction of rotation and the speed of rotation of the high pressure shaft 18. The determining means 38 is connected to the electronic unit 34. The determining means for determining the angular displacement here comprises a sensor, for example, of the resolver type.

To drive the high pressure shaft 18 in the first direction of rotation, the starter 20 applies a first torque, which can be qualified as a pre-starting torque, to the high pressure shaft 18 during a first predetermined duration. Then the starter 20 applies a second pre-starting torque to the high pressure shaft 18 to drive it in the second opposite direction of rotation during a second predetermined duration. This makes it possible to locally heat the fixed lubricant in the turbine engine. The sensor 38 transmits a signal indicating the direction of rotation of the turbine engine to the electronic unit before the starter 20 applies the pre-starting torques to the high power shaft of the turbine engine. The first and the second predetermined durations are for example respectively between 1 s and 10 s, but alternatively much shorter durations can be provided so as to generate micro-oscillations.

During the rotation of the high pressure shaft 18 in the first and second directions of rotation, the latter oscillates according to an angular amplitude that can be between −45° and +45° with respect to a reference position of the turbine engine. In this example, the reference position corresponds to the idle position of the turbine engine wherein a point located in a radial plane perpendicular to the longitudinal axis of the turbine engine will be considered. The angular amplitude can increase progressively during the total duration of the pre-starting step to reach, for example, values between −90° and +90° with respect to the reference position. The increase in the angular amplitude can be caused by a progressive increase in the respective value of the first and second starting torques applied to the high pressure shaft 18 and/or the duration of application of the torque in each direction.

According to an embodiment of the invention, the method comprises a step of determining the outside temperature in which when a signal indicating the outside temperature Text of the turbine engine is less than or equal to a threshold temperature value Tthreshold, the first starting signal is generated to drive the high pressure shaft 18 according to the first and second directions of rotation to oscillate. In this way, the pre-starting step is not systematically applied. This threshold temperature value is determined during development phases of the turbine engine and is stored in a memory of the electronic unit 34 or of the control device 37. The turbine engine comprises an outside temperature sensor 39 which is connected to the electronic unit 34. The latter receives a signal that indicates the outside temperature measured in response to the temperature measured by the temperature sensor and compares it with the threshold temperature value Tthreshold. This threshold temperature value can be around −30° C.

The pre-starting step is carried out for a determined total duration and/or with a predetermined pre-starting rotation speed. The determined total duration of the oscillations can be rather short. Advantageously, but without limitation, the determined total duration DT is between 10 s and 300 s. Likewise, during the pre-starting step, the maximum pre-starting rotation speed reached by the high pressure shaft 18 can be, for example, between 100 rpm and 1000 rpm.

Advantageously, but without limitation, the determined total duration of the oscillations and/or the pre-starting rotation speed is/are determined according to the temperature Text outside the turbine engine. It is possible, for example, during the development phase of the turbine engine, to define for each value of the outside temperature Text in which the turbine engine has to operate, a total duration and/or a pre-starting rotation speed for rotating the high pressure shaft 18. The total durations and/or the pre-starting rotation speeds can be stored in the form of tables. According to the value of the outside temperature Text measured, the control module 33 applies the determined total duration and/or the pre-starting rotation speed V for the high pressure shaft 18.

Advantageously, but without limitation, the determined total duration and/or the pre-starting rotation speed can also be determined according to the temperature of the lubricant in the vicinity of the accessory gearbox 19. To this effect, the method comprises a step of determining a lubricant temperature wherein a temperature of the lubricant is measured in the vicinity of the accessory gearbox 19. A signal that indicates the lubricant temperature in response to the temperature Tlub measured is transmitted to the electronic unit 34. This signal indicating the temperature Tlub measured is compared with a lubricant temperature value Tlubthreshold. When the temperature measured is greater than the threshold lubricant temperature value, the second starting signal of the turbine engine is generated.

The second starting signal is also generated by the control module 33 and is transmitted to the starter 20 driving the high pressure shaft 18 in the normal direction of rotation thereof. This second starting signal can be preceded by a signal for stopping the oscillations sent to the starter 20. The temperature of the lubricant is measured by means of a lubricant temperature sensor (not shown). The latter is placed advantageously, but without limitation, in the accessory gearbox 19 and is also connected to the electronic unit 34. When the temperature measured is less than or equal to the threshold temperature value, the electronic unit 34 emits a control signal for maintaining the pre-starting step.

The determined total duration and/or the pre-starting rotation speed can also be determined according to a resistive torque exerted by the turbine engine. For this, the method comprises a step of determining the resistive torque exerted by the turbine engine. A signal indicating the torque in response to the torque CM measured is transmitted to the electronic unit 34. This torque indicating signal is compared to a threshold torque value Cthreshold for a given rotation speed. As long as the resistive torque measured is greater than the threshold torque value, this means that the viscosity of the lubricant is not sufficiently reduced to make it possible for starting, the pre-starting step is therefore maintained. For this, it can be provided that the electronic unit transmits a control signal to the control module 33 for the maintaining of the pre-starting step. When the resistive torque measured become less than or equal to the threshold torque value, the second starting signal is generated to control the drive shaft of the turbine engine in a normal direction of rotation. For this, the control module 33 transmits to the starter 20 the second starting signal of the turbine engine. As above, this second starting signal can be preceded by a control signal for stopping the pre-starting step. Determining the torque exerted by the turbine engine makes it possible to determine the viscosity of the lubricant in the accessory gearbox 19. In other words, with low torques, the viscosity of the lubricant is reduced which implies that the lubricant is heated. Different torque values for different rotation speeds of the high pressure shaft are stored in the memory of the electronic unit 34 or in the control device 37.

In the starting step, the second starting signal is transmitted to the starter 20 such that the latter drives the high pressure shaft 18 of the turbine engine in a normal starting direction of rotation and wherein the high pressure shaft 18 is rotated from the first speed V0 which can be zero to the second rotation speed V2 that causes the turbine engine to start. It is then understood that the pre-starting rotation speed of the drive shaft during the pre-starting step is less than that of the drive shaft during the starting step. The drive shaft, in the starting step, cannot drive the starting of the turbine engine to prevent the resistive torque.

This second starting signal can be emitted following a starting order from the pilot to the electronic unit 34. In particular, the electronic unit 34 can emit, at the end of the control signal for stopping the pre-starting step, an information signal to the pilot that corresponds to a condition of the viscosity of the lubricant in the accessory gearbox 19 or of outside temperature such that the latter themselves decides to proceed with the starting of the turbine engine. This information can have the form of visual or audio information. The condition of the viscosity of the lubricant is obtained following the step of determining the temperature of the lubricant in the accessory gearbox. The step of determining the temperature of the lubricant in the vicinity of the accessory gearbox can be carried out before the pre-starting step.

Advantageously, the lubricant comprises an oil that can lubricate and cool members of the turbine engine.

In an embodiment, the method comprises a waiting step wherein the second starting signal is generated after a waiting duration. During this step, a signal indicating the direction of rotation or of the stopping of the rotation of the high pressure shaft 18 can be transmitted to the electronic unit 34 so as to verify that the starter 20 is ready to drive the high pressure shaft 18 in the normal direction of rotation.

During the starting step, the starter applies a starting torque to the high pressure shaft 18. The second rotation speed makes it possible to ignite the combustion chamber supplied with compressed air by the compressor. The high pressure shaft 18 undergoes a continuous acceleration until the latter reaches the speed V2.

In the embodiment described with reference to FIG. 2, the accessory gearbox 19 is located in the nacelle. The method for starting according to the invention also applies to turbine engine architectures that have other arrangements of one or more accessory gearboxes, for example an architecture such as described in publication FR2981986A1, wherein the accessory gearbox is located in an inter-duct compartment of a double flow turbine engine.

The invention claimed is:

1. A method for starting a turbine engine in cold weather comprising a starting system intended for rotating a drive shaft of the turbine engine, the method comprising the following steps:
   a pre-starting step, wherein a first starting signal is generated to control the drive shaft in a first direction of rotation about a longitudinal axis and in a second opposite direction of rotation in an alternating manner so as to generate oscillations, and
   a starting step, wherein a second starting signal is generated to control the drive shaft of the turbine engine in a normal direction of rotation corresponding to one of the first and second directions and wherein the drive shaft is rotated up to a rotation speed that causes the turbine engine to start.

2. The method according to claim 1, wherein the drive shaft is a shaft of a high pressure body of the turbine engine which is a two spool and double flow turbine engine.

3. The method according to claim 1, wherein the drive shaft is coupled to an accessory gearbox comprising a lubricant of which the viscosity increases at a low temperature of less than −10° C.

4. The method according to claim 3, further comprising a step of determining a lubricant temperature, wherein a signal that indicates a lubricant temperature (Tlub) measured in the vicinity of the accessory gearbox is compared to a lubricant threshold temperature value (Tlubthreshold) such that, when the lubricant temperature (Tlub) measured is greater than the lubricant threshold temperature value (Tlubthreshold), the second starting signal is generated to drive the drive shaft in the normal direction of rotation.

5. The method according to claim 1, wherein the pre-starting step is carried out for a determined total duration and/or at a predetermined pre-starting rotation speed of the drive shaft.

6. The method according to claim 5, wherein the predetermined total duration of the pre-starting step and/or the predetermined pre-starting rotation speed is/are according to a temperature of a lubricant in the vicinity of an accessory gearbox or according to a resistive torque exerted by the turbine engine or according to a temperature outside the turbine engine.

7. The method according to claim 5, wherein the predetermined pre-starting rotation speed is less than that of the rotation speed (V2) that causes the turbine engine to start.

8. The method according to claim 7, wherein the maximum pre-starting rotation speed of the drive shaft reached during the pre-starting is between 100 rpm and 1000 rpm.

9. The method according to claim 1, further comprising a step of determining a resistive torque exerted by the turbine engine, wherein a signal that indicates the resistive torque measured is compared to a threshold torque value (Cthreshold) for a given rotation speed of the turbine engine such that when the resistive torque measured is less than or equal to the threshold torque value (Cthreshold), the second starting signal is generated.

10. The method according to claim 1, wherein the second starting signal is generated after a predetermined waiting duration that follows the completion of the pre-starting step, the speed (VO) of the drive shaft being zero when the starting step is triggered.

11. The method according to claim 1, wherein the duration of the pre-starting step is predetermined and between 10 s and 300 s.

12. The method according to claim 1, wherein the drive shaft is coupled to an accessory gearbox comprising a lubricant of which the viscosity increases at a low temperature of less than −30° C.

13. A starting system for starting a turbine engine, the starting system comprising an electronic control module, a starter intended to be controlled by the electronic control module and a drive shaft of the turbine engine coupled to the starter, the electronic control module is configured to generate a first starting signal intended to control the rotation of the drive shaft in a first direction of rotation and in a second opposite direction of rotation, alternately and so as to generate oscillations, and to generate a second starting signal intended to control the rotation of the drive shaft in a normal direction of rotation corresponding to one of the first and second directions wherein the drive shaft is rotated up to a rotation speed that causes the turbine engine to start.

14. The starting system according to claim 13, wherein the drive shaft is coupled to an accessory gearbox on which the starter is mounted, the starter being capable of actuating the drive shaft in the first and second opposite directions of rotation, alternately.

15. The starting system according to claim 13, further comprising a temperature detecting means for detecting the temperature connected to the electronic control module and configured to supply a signal indicating the temperature of the lubricant in the vicinity of an accessory gearbox of the turbine engine.

16. The starting system according to claim 13, wherein the electronic control module is configured to receive a signal indicating the resistive torque exerted by the turbine engine.

* * * * *